United States Patent [19]

Scott

[11] Patent Number: 4,591,117
[45] Date of Patent: May 27, 1986

[54] SPACECRAFT NUTATION DAMPING

[75] Inventor: Peter R. Scott, Stevenage, England

[73] Assignee: British Aerospace Public Limited Company, London, England

[21] Appl. No.: 588,822

[22] Filed: Mar. 12, 1984

[30] Foreign Application Priority Data

Mar. 12, 1983 [GB] United Kingdom ............... 8306859

[51] Int. Cl.$^4$ ............................................. B64G 1/38
[52] U.S. Cl. ..................................... 244/170; 244/169
[58] Field of Search ................... 244/170, 171, 164; 318/648, 649; 364/434

[56] References Cited

U.S. PATENT DOCUMENTS 2,806,062  4/1974  Hofmann et al. .
4,096,427  6/1978  Rosen et al. ....................... 244/170
4,174,819  11/1979 Brüderle et al. .................... 244/170
4,189,947  2/1980  Friedland .
4,193,570  3/1980  Hoffman et al. .
4,370,716  1/1983  Amieux .
4,386,750  6/1983  Hoffman .

OTHER PUBLICATIONS

Kaplan, Modern, *Spacecraft Dynamics & Control*, 1976, 379–394.

*Primary Examiner*—Galen L. Barefoot
*Attorney, Agent, or Firm*—Cushman, Darby & Cushman

[57] ABSTRACT

An active nutation damping system for a spacecraft may comprise a nutation sensor controlling an actuator, a thruster say, via a control system so as to produce nutation opposing torques. Following the realization that performance limits on known systems may be due to a simplistic dynamic analysis which assumes the spacecraft to be a rigid body when it may in fact comprise one or more oscillatory elements, for example a fuel tank in which fuel is able to 'slosh' about freely, the damping system herein is operable to identify two types of nutation component, for one of which appropriate opposing torque components are generated while, for the other type, torque components are generated that, at first sight, would appear to increase the nutation components but which, in fact, improve the overall nutation damping performance.

5 Claims, 4 Drawing Figures

SPACECRAFT NUTATION DAMPING

An active nutation damping system may be provided in a spin-stabilised spacecraft, particularly a so-called 'prolate' spacecraft which spins about that one of its axes which has the minimum moment of inertia, in order to prevent the growth of a coning motion of the spacecraft, i.e. nutation. Such a damping system generally comprises some form of sensor for sensing nutation, for example an accelerometer arranged to provide a signal indicative of the oscillatory rotation rate about one of the non-spin body axes executed by a nutating spacecraft, an actuator for generating a torque which opposes the nutation, for example one or more thrusters or some form of spinning torque generating element, and between the sensor and actuator a signal processing system for properly controlling the actuator in response to the sensor.

It is known for the signal processing system to impart a predetermined degree of phase-shifting to the sensor signal to take account of the relative positions on the spacecraft of the sensor and the actuator, i.e. if the sensor senses oscillation about one non-spin body axis while each thrust impulse of a thruster used as the actuator generates a torque impulse about another non-spin body axis, then clearly the sensor signal and the thruster impulses have to be proerly phased in dependence upon the displacement between these axes.

The prior art seems to make the assumption that spacecraft nutation consists of a fairly simple coning motion such that the sensor signal for example will comprise substantially a single frequency sinusoidal signal. For example, U.S. Pat. Nos. 4,189,947, 4,193,470, 4,370,716 and 4,386,750 describe nutation control systems but clearly envisage a unique nutation frequency. U.S. Pat. No. 3,806,062 refers to plural nutation frequencies but envisages that only one would be applicable at any one time in the satellite's history.

Furthermore, where phase relations are explicitly defined (e.g. U.S. Pat. No. 4,370,716), the control torque is out of phase by 180° with the corresponding rotation rate due to nutation.

It has been found that the performance of known active nutation damping systems is not sufficient in the context of some spacecraft and it is an object of the invention to provide the means for improving it.

The invention is based upon our realisation that while the above-mentioned assumption may be satisfactory in the context of a nearly rigid spacecraft, the presence of one or more oscillatory elements may render it insufficient. A major example of such an oscillatory element would comprise a quantity of liquid, fuel say, able to move about within its container. Such a 'sloshing' liquid is capable of oscillating in many modes and producing a consequent number of nutation modes of the craft. The signal from a nutation sensor on board craft carrying a sloshing liquid may comprise a plurality of Fourier frequency components. Following on from the above realisation, it has been further realised that these components may have to be treated differently, depending on the dynamical response of the system to a control torque applied to the satellite body.

For a rigid or nearly rigid spacecraft, it is sufficient to ensure that the control torque about each transverse axis is of opposite sign to the instantaneous angular velocity component about the same axis.

However, in a nutation mode dominated by liquid sloshing, such a control law may cause the amplitude of the sloshing to increase, and the nutation angle associated with such mode would therefore increase.

In order to achieve satisfactory control in such a case, it is necessary for the control system to distinguish between the modes and to apply for each mode a control torque which is either of the same sign as the angular velocity component about the same axis, or of opposite sign, depending on the character of the mode. The identification of the modes and the determination of their respective characters may be achieved by theoretical analysis and/or by experimentation. Such experimentation may be carried out using an actual satellite or part thereof, or any dyamically equivalent representation.

According to one aspect of the invention, there is provided an active nutation damping system for a spacecraft, the system comprising sensor means for supplying a time varying signal indicative of nutation of the spacecraft, actuating means for applying a compensatory torque to the craft, and signal processing means for controlling the actuating means to cause the application to the craft of time varying nutation reducing torque having Fourier frequency components corresponding to respective Fourier frequency components of the sensor signal, the processing means being such as to differentiate between a first and a second class of said components with the or each sensor waveform component belonging to one class having a first phase relationship with the corresponding torque waveform component, and the or each sensor waveform component belonging to the second class having a second phase relationship with the corresponding torque waveform component, the first and second phase relationships being substantially opposite to one another.

According to a second aspect of the invention, there is provided an active nutation damping system for a spacecraft, the system comprising sensor means for supplying a time varying signal indicative of nutation of the spacecraft, actuating means for applying a compensatory torque to the craft, and signal processing means for controlling the actuating means to cause the application to the craft of time varying nutation reducing torque having Fourier, frequency components corresponding to respective Fourier frequency components of the senal, the processing means being such as to differentiate between a first and a second class of said components such that the component of the angular velocity of the satellite body about a transverse axis as determined by each sensor waveform of the first class is substantially opposite in phase to the corresponding torque waveform about the same axis, and the component of the angular velocity of the satellite body about a transverse axis as determined by each sensor waveform of the second class is substantially in phase with the corresponding torque waveform about this axis.

In the above, the term "transverse axis" means any axis orthogonal to the spin axis.

It will be appreciated that waveforms originating from different sensors of the sensor means are construed as different Fourier components even if their frequencies are equal.

For a better understanding of the invention, reference will be made, by way of example, to the accompanying drawings, in which.

Figure 1:
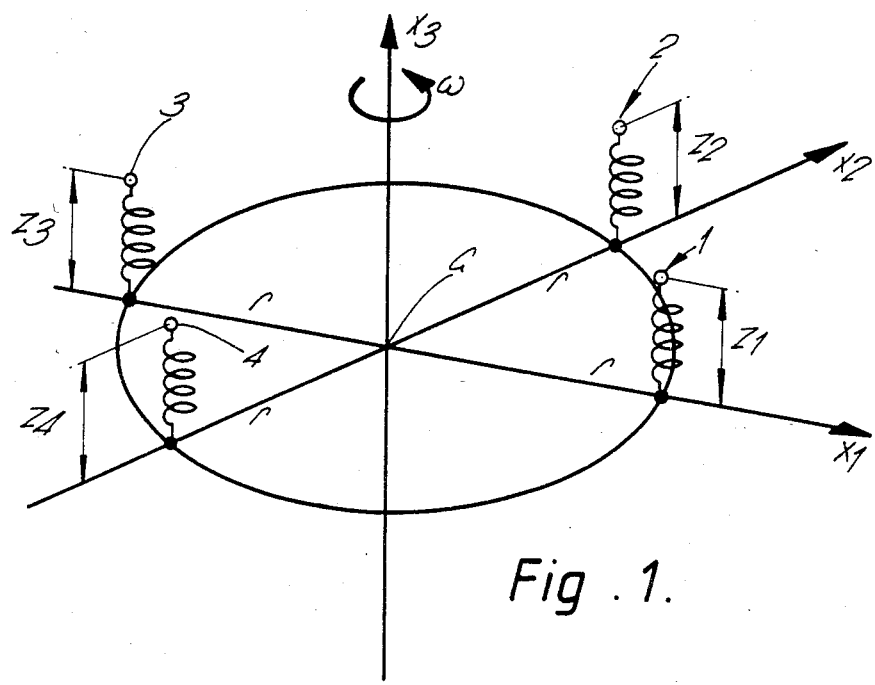
FIG. 1 is a diagrammatic view of a model of a satellite.

In order to explain the dynamic characteristics of a spinning satellite comprising one or more oscillatory elements, reference is first made to the diagram of an exemplary satellite model shown in FIG. 1.

This satellite model consists of the following parts:

A central body (shown as a disc D for simplicity) having principal inertias $A'$, $A'$, $C'$ about $x_1$, $x_2$, $x_3$ axes respectively, with the satellite spinning at rate w about the $x_3$-axis;

An oscillator 1 consisting of a mass m sliding in a body-fixed groove parallel to the spin axis and subject to a restoring force $(-\lambda x_1)$ where $x_1$ is its position co-ordinate relative to the centre of mass G; the groove intersecting the $x_1$-axis at $x_1=r$ (a given positive parameter).

Three other oscillators 2, 3 and 4 identical with the first but in grooves cutting respectively the $x_2$-axis, the negative $x_1$-axis and the negative $x_2$-axis, all at distance r from the spin axis.

As shown below, the parameters of this model can be so chosen that the conventional nutation damping control law described earlier drives the nutation to increase. The analysis is linearised by assuming small disturbances from a state of uniform rotation, and energy dissipation due to viscosity (etc.) is assumed to be negligible compared with the effects of control torques.

The following symbols have the meanings given:

| Symbol | Meaning |
| --- | --- |
| A,C | Principal moments of inertia of system (A about $x_1$ and $x_2$ axes, C about $x_3$ axis). |
| A',C' | Principal moments of inertia of rigid part (A' about $x_1$ and $x_2$ axes, C' about $x_3$ axis). |
| h | Angular momentum vector. |
| I | $2mr^2$ |
| j | $\sqrt{-1}$ |
| k | Coefficient in control law |
| m | Mass of oscillator |
| P,Q | Polynomials as described hereinafter |
| r | Distance of oscillator from spin axis |
| t | Time |
| $(x_1,x_2,x_3)$ | Co-ordinates with $x_3$ along spin direction |
| $Z_i (i=1,2,3,4)$ | Displacement co-ordinate of oscillator i. |
| $\nu$ | Natural frequency of oscillator |
| w | Satellite spin rate |
| $w_o$ | Amplitude of $w_1$ or $w_2$ |
| $w_1, w_2$ | Angular velocity components of rigid part about $x_1$, $x_2$ axes respectively |
| $\Omega$ | System natural frequency |
| $\Omega_1, \Omega_2, \Omega_3$ | The 3 values of $\Omega$ in the case analysed. |

In the first instance, the dynamics are analysed without any control torque being applied.

The system is effectively cylindrically symmetrical about the $x_3$-axis, and the analysis is simplified by postulating a nutation of the form:

$$w_1 = w_0 \exp(j\Omega t) \\ w_2 = jw_0 \exp(j\Omega t) = -jw_1 \quad \} \quad (1)$$

in which real parts are to be understood throughout. The natural frequency may be real in the absence of both energy dissipation and control torques, signifying nutation at a constant amplitude. It is shown below that $\Omega$ satisfies a cubic equation; subsequently a control torque is introduced, causing the roots to become complex, corresponding to growth or damping of nutation.

First, the torque exerted on the system by the oscillators 1 to 4 is determined.

Viewed in body co-ordinates, the oscillator 1 experiences an effective gravity force due to the acceleration of a body-fixed point in the direction parallel to the groove in which the oscillator slides. This acceleration is, by a standard formula, $$r(-\dot{w}_2 + w_1 w).$$

Furthermore, since $w_2 = -jw_1$ and $d/(dt) = j\Omega$, this reduces to $r(w-\Omega)w_1$.

The equation of motion of the oscillator 1 is therefore $$\ddot{Z}_1 + \nu^2 Z_1 = -r(w-\Omega)w_1 \text{ from which}$$

$$Z_1 = \frac{r(w-\Omega)w_1}{(\Omega^2 - \nu^2)}$$

Similarly, $$Z_2 = \frac{r(w-\Omega)w_2}{(\Omega^2 - \nu^2)}$$

$$Z_3 = -Z_1;$$
$$Z_4 = -Z_2.$$

The component of angular momentum of the 4 oscillators about the $x_1$-axis is $$h_1 = mr(-wZ_1 + (\dot{Z}_2 + rw_1) + wZ_3 - (\dot{Z}_4 - rw_1))$$

$$= 2mr(\dot{Z}_2 - wZ_1) + 2mr^2 w_1$$

The term $2mr^2 w_1$ is the "rigid-body" value which would apply in the limiting case $\nu \to \infty$. This term may be dropped provided the inertias ($2mr^2$, $2mr^2$, $4mr^2$) are added to the inertias of the rigid satellite body, i.e. the total inertias (A,A,C) are used instead of (A',A',C'). The relevant component of angular momentum of the oscillators becomes $$h_1' = 2mr(\dot{Z}_2 - wZ_1)$$

$$= \frac{2mr^2(w-\Omega)^2 w_1}{(\nu^2 - \Omega^2)}$$

the corresponding angular momentum vector is $$h' = \frac{I(w-\Omega)^2}{(\nu^2 - \Omega^2)}(w_1, w_2, 0).$$

The inertial rate of change of $\underline{h}'$ is $$\frac{\partial \mu'}{\partial t} + (w_1, w_2, w) \times h',$$

of which the $x_1$-component is $$\frac{I(w-\Omega)^2}{(\nu^2-\Omega^2)}(\dot{w}_1 - ww_2) = \frac{I(w-\Omega)^2(w+\Omega)w_2}{(\Omega^2-\nu^2)}$$

(by equations (1)).

The equation of motion of the satellite (Euler's equation) can therefore be written as $$A\dot{w}_1 + (C-A)ww_2 = \frac{-I(w-\Omega)^2(w+\Omega)w_2}{(\Omega^2-\nu^2)}$$

Using equations (1) again to eliminate $w_1$ and $2_w$ gives the following equation for the characteristic frequency $\Omega$:

$$[(A-C)w+A\Omega](\Omega^2-\nu^2)-I(w-\Omega)^2(w+\Omega)=0.$$

If now a control law is postulated such that the control torque is $(-kw_1, -kw_2, 0)$ where $k>0$, the equation of motion becomes $$A\dot{w}_1 + (C-A)ww_2 + \frac{I(w-\Omega)^2(w+\Omega)w_2}{(\Omega^2-\nu^2)} = -kw_1$$

It is here assumed that $k$ is a small constant so that $k^2$, etc., may be neglected. The matter of interest is the dependence of $\Omega$ on $k$. The fact that $k\neq 0$ implies the $\Omega$ is complex (as will be seen), so that the nutational modes are either damped or excited.

Using equations (1) to eliminate $w_1$ and $w_2$ leads to the following equation:

$$[(A-C)w+A\Omega](\Omega^2-\nu^2)-I(w-\Omega)^2(w+\Omega)=kj(\Omega^2-\nu^2) \quad (2)$$

Let $\Omega_1^0$, $\Omega_2^0$, $\Omega_3^0$ be the real roots of the equation with $k=0$. By Taylor's Theorem, the root $\Omega_i$ ($i=1, 2$ or 3) of equation (2) is $$\Omega_i = \Omega_i^0 + k\frac{\partial\Omega_i}{\partial k}$$

to first order in $k$. Equation (2) is used to determine $(\partial\Omega/\partial k)$.

Let $P(\Omega)$ be the cubic polynomial on the left-hand side of equation (2), and $Q(\Omega)=(\Omega^2-\nu^2)$.

Differentiation gives $$\left(\frac{\partial\Omega}{\partial k}\right)_{k=0} = jQ(\Omega)/P'(\Omega).$$

From the foregoing, the root of the cubic becomes to first order in $k$:

$$\Omega_i = \Omega_i^0 + jkQ(\Omega_i^0)/P'(\Omega_i^0).$$

Since the time-dependence of $w_1$, $w_2$ etc. is proportional to $\exp(j\Omega t)$, and $k>0$ by hypothesis, the condition for successful control ($w_1 \to 0$ as $t \to \infty$) is that $$Q(\Omega_i^0)/P'(\Omega_i^0)>0, \text{ all } i(1, 2 \& 3) \quad (3)$$

It is shown next that there exist parametric values for which the inequalities (3) are violated.

Specifically, it is shown that if the oscillator frequency $\nu$ is infinitesimally less than the spin rate $w$, these conditions are fulfilled.

Let $$\nu=w(1+\epsilon)$$

where $|\epsilon|<<1$.

In the limiting case $\epsilon=0$, the roots are $$\Omega_1^0 = -w$$

$$\Omega_2^0 = \left(\frac{C-A-I}{A-I}\right)w = \left(\frac{C'-A'}{A'}\right)w$$

$$\Omega_3^0 = w.$$

In this restricted case ($\epsilon=0$), it is readily shown that $$P'(\Omega_1^0)>0 \text{ and } P'(\Omega_2^0)>0, \quad (4)$$

since $P$ is a cubic polynomial of which the leading coefficient $(A-I)=A'$ is positive; and also that $$Q(\Omega_2^0) = \left(\frac{C-A'}{A'}\right)^2 w^2 - w^2 < 0 \quad (5)$$

($C'$ must be less than $2A'$ because for a rigid body such as the satellite without the oscillators, one principal moment of inertia must be less than the sum of the other two).

However, $Q(\Omega_1^0)=0$.

In the more general case with $\epsilon\neq 0$, the relations (4) and (5) remain true because the left-hand sides only change infinitesimally. It remains to show that with $\epsilon<0$, $Q(\Omega_1^0)$ is negative.

The value of $\Omega_1^0$ is to be obtained by substituting $$\Omega=(-w+\delta)$$

$$\nu=w(1+\epsilon)$$

$$k=0$$

into equation (2), and solving for $\delta$ with squares and products of $\epsilon$ and $\delta$ ignored.

This leads to $$\Omega_1^0 = -w - \left(\frac{Cw\epsilon}{C-2I}\right)$$

from which $$Q(\Omega_1) = \Omega_1^2 - \nu^2 = \frac{4w^2 I\epsilon}{(C-2I)}$$

$(C-2I)=C'$ is positive.

Therefore, if $\epsilon<0$, $Q(\Omega_1)<0$ and we have:

$$\frac{Q(\Omega_1)}{P'(\Omega_1)} < 0; \frac{Q(\Omega_2)}{P'(\Omega_2)} > 0$$

This and conditions (3) complete the proof that there exist sets of parameters such that the analysed configuration is destabilised by the conventional control law defined so that the control torque is always out of phase with the transverse components of angular velocity of the rigid body.

From the foregoing, if control is to be achieved, the control law must ideally have the form Torque $\alpha \pm$ Transverse body rate, with the sign being adjusted according to the character of each particular mode (i.e. positive for those modes which are stabilised by a negative value of k, and negative for the other modes). This is precisely what is proposed in the present invention.

The following general description of the nutational motion of a satellite is based on the assumption of an axially symmetric system, but would be essentially similar for the more general case.

The time-dependence of $w_1$ and $w_2$ for an uncontrolled satellite is given by the following equations.

$$w_1 = \sum_{m=1}^{M} (a_m \cos \Omega_m t + b_m \sin \Omega_m t) + \ldots$$
$$\sum_{m=1}^{M} (c_m \cos \nu_m t + d_m \sin \nu_m t)$$
$$w_2 = \sum_{m=1}^{M} (-b_m \cos \Omega_m t + a_m \sin \Omega_m t) + \ldots$$
$$\sum_{m=1}^{M} (-d_m \cos \nu_m t + c_m \sin \nu_m t)$$

(6)

Notes:

(i) for an unsymmetrical satellite, the magnitudes of the coefficients in the second equation would be different to those of the first equation, i.e., the coefficients $-b_m, a_m, -d_m$ and $c_m$ in the equation for $W_2$ would be replaced by $-b'_m, a'_m, -d'_m$ and $c'_m$, respectively;

(ii) The action of viscosity is neglected in equation (1); its inclusion would result in each term being multiplied by an exponential term—e.g. exp $(\pm k_m t)$—but the rates of change resulting from the exponential terms are normally small enough to be ignored. The changes of frequency $(\Omega_M, \nu_M)$ due to viscosity are also normally negligible);

(iii) It is also possible in the absence of viscosity for some terms to be multiplied by an exponential factor, in which case the satellite is said to be dynamically unstable. This corresponds to cases in the above example where the cubic equation for $\Omega$ has two complex roots. For the present discussion, this possibility is ignored although the invention is deemed nevertheless to be applicable in such a case.

The frequencies $\Omega_1 \ldots \Omega_M, \nu_1, \ldots, \nu_N$ are characteristic of the satellite—with its particular propellant load and oscillators—at a given rate of rotation. The frequencies labelled $\Omega_m$ are not distinguishable from those labelled $\nu_m$ by reference to equations (6); the distinction arises when the response of the satellite to an applied torque is considered. The frequencies $\Omega_1, \ldots, \Omega_M$ have the following property. Choose any one of these $\Omega_m$. Let the satellite body be subject to a time varying torque vector of very small magnitude T at freuency $\Omega_m$ which is in phase with the satellite's component of angular velocity at this frequency; that is:

$$\text{torque} = \frac{+T}{(a_m^2 + b_m^2)^{\frac{1}{2}}} \cdot (a_m \cos \Omega_m t + b_m \sin \Omega_m t, \ldots -$$

$$b_m \cos \Omega_m t + a_m \sin \Omega_m t, 0)$$

where $T > 0$.

Then the equation (1) still describes the motion except that $a_m$ and $b_m$ both increase in numerical value with increasing time (unless either is zero) with increasing time. That is, a torque which is in phase with the angular velocity at frequency $\Omega_m$ causes the amplitude of nutation at that frequency to increase.

The frequencies $\nu_1, \nu_2, \ldots, \nu_N$ have a different property: a torque which is phase with the angular velocity at frequency $\nu_m$, causes the amplitude of nutation at that frequency to decrease. Specifically, let a small torque T be applied to the satellite body where now $$T = \frac{T}{(c_m^2 + d_m^2)^{\frac{1}{2}}} \cdot (c_m \cos \nu_m t + d_m \sin \nu_m t, -$$

$$d_m \cos \nu_m t + c_m \sin \nu_m t, 0)$$

where T is a small positive quantity.

Then the resulting change of nutation is such that $c_m$ and $d_m$ decrease in numerical value, unless either is zero in which case it remains zero.

The evaluation of the frequencies $\Omega_1, \ldots \nu_N$ and the distinction between the two classes is determined by any appropriate method, for example by mathematical analysis using an accurate representation of the spacecraft, or by measurement either in real time or off-line and either using the spacecraft itself or a dynamically equivalent model.

The response of a sensor to this form of nutation is a matter of interest. By way of example, assume that an accelerometer is placed on the $x_1$-axis at distance r from the spin axis, and measuring the acceleration component parallel to the spin axis. From the previous analysis of the oscillator located at this point, the accelerometer reading is $r(w - \Omega)w_1$ provided the satellite nutates at frequency $\Omega$; $\Omega$ is one of $\Omega_1, \ldots, \nu_N$. Furthermore, $w_2 = -jw_1 = -(w_1/\Omega)$; so for each separate frequency, this one sensor gives the time histories of both $w_1$ and $w_2$. (It is presumed that all of ($\Omega_1$ to $\nu_N$) have been determined).

For any other type of sensor, it is envisaged that $w_1$ and $w_2$ will be measurable analogously to the above.

In order to generate values of $w_1$ and $w_2$ in accordance with the preceding description, it is envisaged that the sensor output will be passed through two linear filters (one for each of $w_1$ and $w_2$) the design of which will be achievable by those skilled in the art.

Thus generally, a nutation damping system according to the invention comprises a signal processing system which receives input signals from one or more sensing devices normally attached rigidly or otherwise to the body of a spinning satellite. The output signals from the system are torque demands and are sent to one or more actuators mounted on the satellite. The processing system may be on board the same satellite or placed in any other convenient location or orbit.

Ideally the system includes linear filters with characteristics as follows:

As mentioned, there exist two sets of frequencies which chiefly characterise the nutational behaviour of the particular satellite being controlled (assuming a defined rate of body rotation). Let these be $\Omega_1, \Omega_2, \ldots, \Omega_M$, (the frequencies of the "unstable modes of nutation", hereinafter called "the unstable frequencies") and $\nu_1, \nu_2, \ldots, \nu_N$ ("the stable frequencies").

The filter consists conceptually of two parts (which may however be merged): a first part which serves to translate sensor outputs into signals representing $w_1$ and/or $w_2$ (the transverse angular velocity components), and a second part which serves to translate $w_1$ and/or $w_2$ into one or two torque demand components $T_1$ and/or $T_2$ (or a linear combination of $T_1$ and $T_2$), about one or more transverse axes.

The first part of the filter operates on the output of each sensor so that, in case the satellite body nutates in any one of the coning motions at frequency (which is one of $\Omega_1, \Omega_2, \ldots, \nu_N$), the filter output(s) represent $w_1$ and/or $w_2$ correctly with regard to phase, although possibly scaled in amplitude. The filter which achieves this represents known technology; for example, in the case of accelerometers of the type defined above, $$w_1 = \frac{1}{r(w^2 + s^2)} \cdot (wa_1 + sa_2)$$

where $a_1$ and $a_2$ are the readings of accelerometers mounted on the respective $x_1$ and $x_2$ axes, both at distance r from the spin axis, and s is the time-derivative operator.

For a second example, if all the natural frequencies $\Omega_1, \ldots, \nu_N$ are less than w, then $(a_1/wr)$ may be a suitable representation of $w_1$, having at least the correct phase behavior.

The second part of the filter operates on one or more estimates of $w_1$ and/or of $w_2$ to generate the torque demand component(s) $T_1$ and/or $T_2$.

The second part of the filter is such that for a purely sinusoidal input signal at any one of the unstable frequencies $\Omega_1, \Omega_2 \ldots \Omega_M$ the output signal is sinusoidal at the input frequency and differs in phase by 180° from the input signal. Meanwhile, for a purely sinusoidal input signal at any one of the stable frequencies $\nu_1, \nu_2, \ldots \nu_N$ the output signal is sinusoidal at the input frequency and is in phase with the input signal. In each case, the output amplitude should be big enough at each frequency ($\Omega_m$ or $\nu_m$) to give a well defined signal.

As described, this serves to generate a torque demand about a transverse axis from an input representing the angular velocity component about the same axis.

The linearity of the filters is sufficient to define their behaviour when subject to a more complex input than the single frequency hypothesized above; it being assumed that in any case the input will consist substantially of a linear combination of signals at the frequencies $\Omega_1, \Omega_2, \ldots, \nu_N$.

The filter characteristics may include the introduction of an arbitrary phase change of the output signal which would serve to compensate for the relative positions on the spacecraft of the sensor and actuator, or for a delay in the operation of the actuator, and which is precisely the same at every frequency $\Omega_1 \ldots, \Omega_M, \nu_1, \ldots \nu_N$, and, superimposed on the foregoing, a phase change of the output signal which is strictly less than 90° and greater than −90° (possibly different for each frequency $\Omega_1, \ldots, \Omega_M, \nu_1, \ldots, \nu_N$) and/or a frequency-dependent change of amplitude of the output signal (the last two possibilities representing permitted deviations from the ideal), and/or additional processing to filter out sensor noise and constant bias; and/or any non-linear behaviour provided that a signal comprising a linear combination of Fourier components having frequencies from among $\Omega_1, \ldots, \ldots, \Omega_M, \nu_1 \ldots \nu_N$ is processed substantially as described above.

Using the above possibilities of variation of the filter characteristics, the possibility of different spin rates of the spacecraft and the consequent different sets of characteristic frequency components $\Omega$ and $\nu$ may be allowed for either by modifying the characterisitics in flight or by setting them initially to obtain some acceptable compromise between them.

The actuator(s) could comprise one or more thrusters or movable paddles immersed in the said sloshing liquids or, as in the prior art, any other suitable compensating torque generating device. The sensor(s) could comprise linear accelerometers (which is presently preferred) but could alternatively comprise, by way of example any of the following: angular accelerometers: gyroscopes: fluid motion sensors measuring liquid sloshing directly (e.g. aneroid barometer; pitot tube; accelerometer mounted inside flotation device): oscillation detector (e.g. optical).

It is alternatively envisaged that a satellite may be equipped with two or more independently acting control systems each being dedicated to the control of a subset of the nutation modes of the satellite in accordance with the principles defined above. For example, one system might be dedicated to control the stable modes while the other might control the unstable modes. In this case, provided each such control subsystem is efficient in damping the appropriate modes, its action on other modes might permissibly not be a damping action.

Figure 2:
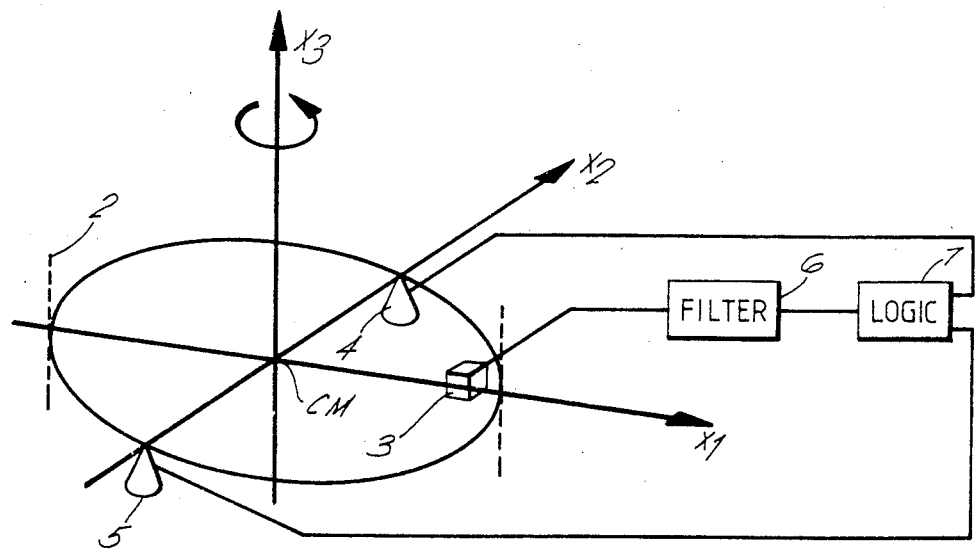
FIG. 2 is a diagrammatic view of part of a satellite and an active nutation damping system.

FIG. 2 shows a section plane 1 intersecting the centre of mass CM of a prolate spin-stabilised satellite 2 (not fully shown), which satellite is spun about its yaw axis $x_3$ perpendicular to plane 1 by spin-up thrusters (not shown) or otherwise, the satellite comprising an oscillatory element in the form of a sloshing liquid, propellant for example, in a tank (not shown). Nutation of the satellite produces an oscillatory rotation about an arbitrary axis lying in the plane 1, i.e. each non-spin transverse body axis, including the roll and pitch axes $x_1$ and $x_2$ respectively. This rotation is sensed by an accelerometer 3 positioned on the roll axis $x_1$ near the satellite circumference. Two nutation compensating thrusters 4 and 5 are positioned near respective ends of the intersections between the satellite circumference with the pitch axis $x_2$. Axes $x_1$ and $x_2$ are perpendicular to one another (and to axis $x_3$ of course) and the thrusters 4 and 5 direct thrust in a direction parallel to the yaw axis $x_3$. Thus, when operating the thrusters produce respective opposite torques $+T$ and $-T$ about the roll axis $x_1$.

The signal from the accelerometer 3 comprises a sinusoid with possibly two important Fourier components $\Omega_1$ and $\nu_1$, $\Omega_1$ being less than $\nu_1$.

This signal is fed to a filter 6 designed to affect the respective frequency components of the accelerometer signal in the manner described earlier. Thus the filter could have a transfer characteristic of the general form:

$$\frac{S(1 + \tau_1^2 S^2)}{(1 + \tau_2 S)^2}$$

where $\tau_1$ is the major factor, being dependent upon the dynamics of the satellite but by way of example having a possible value of $2/(\Omega_1+\nu_1)$ and where $\tau_2$ is a smoothing factor normally chosen to have a relatively small value compared with $\tau_1$, for example $0.02\ \tau_1$.

Figure 3:
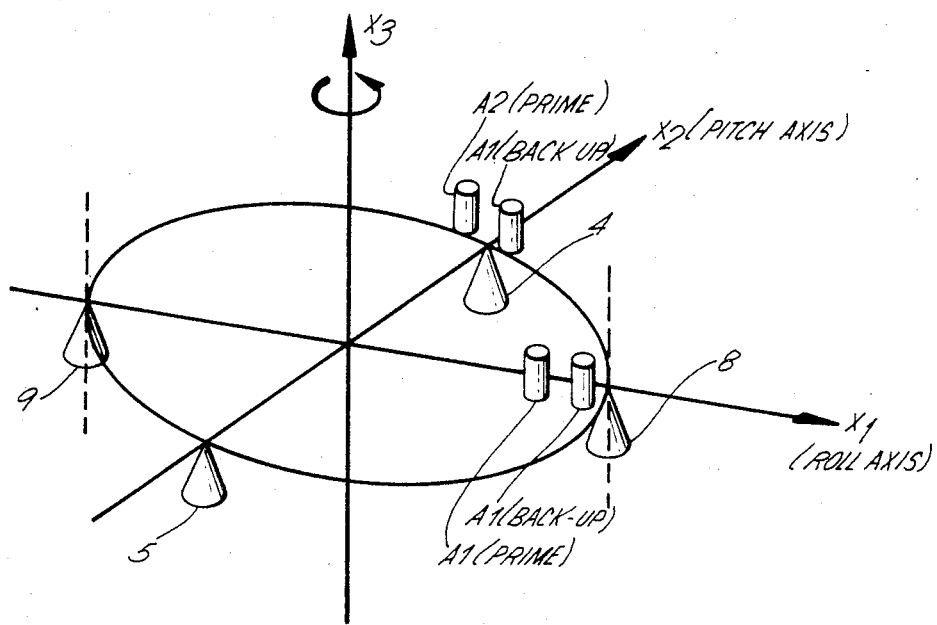
FIG. 3 is a view, similar to FIG. 2, of another satellite.

The output F from filter 6 is fed to a comparator and logic circuit 7 which in turn controls the thrusters 4 and 5 via appropriate control valves or the like (not shown). The circuit 7 comprises a comparator which compares the filtered accelerometer signal F with upper and lower positive threshold values THRU and THRL respectively and with two threshold values $-$THRU and $-$THRL, respectively equal in magnitude to THRU and THRL but of opposite polarity. Depending upon the comparison, the logic part of circuit 7 controls the thrusters 4 and 5 to produce the aforementioned torques $+$T and $-$T according to the followig rules:
 if F>THRU then $-$T on
 if F>THRL then $-$T off
 if F<$-$THRU then $+$T on
 if F<$-$THRL then $+$T off FIGS. 3 and 4 relate to a further embodiment of a nutation damping system which includes a degree of redundancy of the various components. FIG. 3 is the same as FIG. 2 except that here two accelerometers A1(prime) and A1(back-up) are positioned near one intersection of the roll axis $x_1$ with the circumference of satellite 2 and two accelerometers A2(prime) and A2(back-up) are positioned near one intersection of pitch axis $x_2$, with the satellite circumference, i.e. at the position occupied by accelerometer 3 in FIG. 2. Roll thrusters 4 and 5 are positioned as before to produce opposite torques $+$TR and $-$TR and two further thrusters 8 and 9 are positioned near respective ones of the intersections between roll axis $x_1$ and the satellite circumference. Thrusters 8 and 9 act in the same direction as thrusters 4 and 5 and thus produce opposite torques $-$TP and $+$TP about the pitch axis $x_2$.

Figure 4:
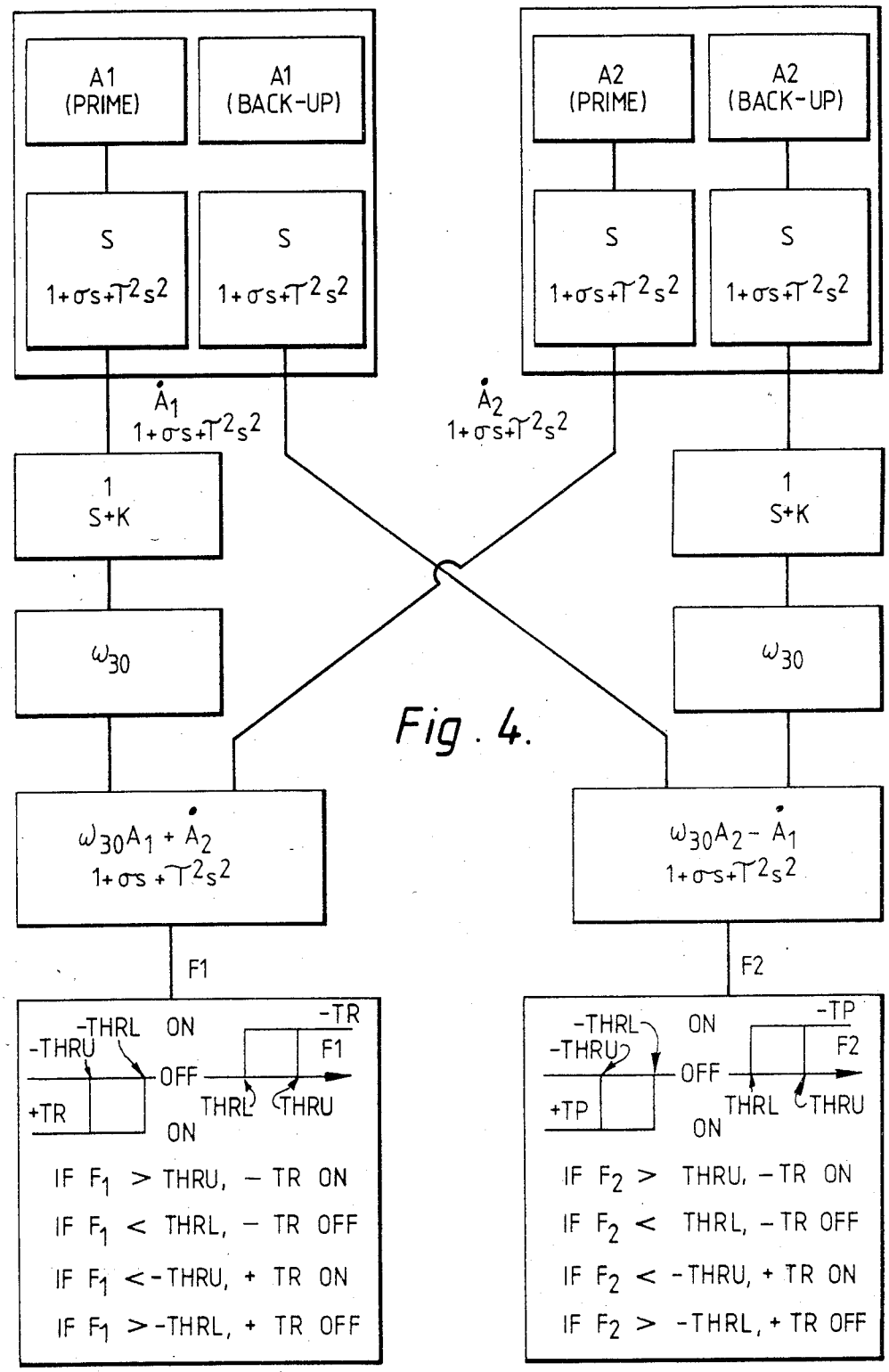
FIG. 4 is a functional block diagram of an active nutation damping system for the FIG. 3 satellite.

As shown in FIG. 4, the output signals $A_1$ from the respective accelerometers A1(prime) and A1(back-up) and the output signals $A_2$ from the respective accelerometers A2(prime) and A2(back-up) are fed to respective inputs of four filters 10 each having a transfer characteristic of the form:

$$\frac{s}{1 + \sigma s + \tau^2 s^2}$$

and providing respective output signals of the form:

$$\frac{\dot{A}_1}{(1 + \sigma s + \tau^2 s^2)} \text{ or } \frac{\dot{A}_2}{(1 + \sigma s\ \tau^2 s^2)}$$

as appropriate.

The output of that filter 10 which receives the signal $A_1$ from accelerometer A1(prime) is fed via two further signal processing stages, respectively an integrating element 11 having a characteristic of the form $1/(s+k)$ where k might be around $0.03\ s^{-1}$ and a gain element 12 giving a gain factor of $W_{30}$ (i.e. the pre-programmed value of the spin rate $w_3$) to an adder 13 which also receives, direct, the output of the filter 10 which is connected to accelerometer A2(prime). Thus, adder 13 forms the sum $F_1$ where:

$$F_1 = \frac{w_{30} A_1 + \dot{A}_2}{(1 + \sigma s + \tau^2 s^2)}$$

The signal $F_1$ is fed to a comparison and logic circuit 14 similar to the circuit 7 in FIG. 1 and operable to control the roll thrusters 4 and 5 according to the following rules:
 if $F_1$>THRU then $-$TR on
 if $F_1$<THRL then $-$TR off
 if $F_1$<$-$THRU then $+$TR on
 if $F_1$>$-$THRL then $+$TR off Meanwhile, the output of filter 10 connected to accelerometer A2(back-up) is fed through processing elements 15 and 16, respectively identical to the elements 11 and 12, and then subtractively combined by adder 17 with the output of that filter 10 which is connected to accelerometer A1(back-up) to give a signal $F_2$ where:

$$F_2 = \frac{w_{30} A_2 - \dot{A}_1}{(1 + \sigma s + \tau^2 s^2)}$$

Signal $F_2$ is fed to a circuit 18 which controls thrusters 8 and 9 in accordance with exactly the same rules as were set for circuit 14 except that the term $F_1$ is replaced by $F_2$ and the terms $+$TR and $-$TR are replaced by the pitch torques $-$TP and $+$TP respectively.

Although the characteristics of filters 10 are different from that specified for filter 6 in FIG. 2, they are again effective in accordance with the principles described earlier. The redundancy comes about in FIGS. 3 and 4 in that there are two separate channels respectively controlling the pitch thrusters and the roll thrusters. The two channels normally work simultaneously to give nutation damping but should either fail then the other can carry on to give an adequate, if lessened, damping effect.

As mentioned earlier, the detailed design of the filters and such is done on the basis of measurement and/or calculation of the satellite dynamics. The various parameters will generally be dependent upon the spin rate of the satellite and it may be that the satellite is intended to go through two spin phases, a pre-burn and a post-burn phase for example, during which not only the spin rate may be different but possibly other factors as well (some of the fuel on-board may have been consumed perhaps). If so, the parameters may be made selectable. For example, in FIG. 4, it may well be desirable to modify the value of $\tau$ at the filters 10 and the gain factor $W_{30}$ for the post-burn phase relative to the values for pre-burn.

We claim:
1. An active nutation damping system for a spin-stabilised spacecraft, the system comprising:
 sensor means for supplying a time varying signal indicative of nutation of the spacecraft,
 actuating means for applying a compensatory torque to the craft, and
 signal processing means for controlling the actuating means to cause the application to the craft of time varying nutation reducing torque having Fourier frequency components corresponding to respective Fourier frequency components of the sensor signal, the processing means being structured to differentiate between a first and a second class of said components such that the component of the angular velocity of the craft about any axis orthogonal to its spin axis as determined by each sensor signal component of the first class is substantially opposite in phase to the corresponding torque component about the same orthogonal axis, and the component of the angular velocity of the craft about any axis orthogonal to its spin axis as determined by each sensor signal component of the second class is substantially in phase with the corresponding torque component about this orthogonal axis.

2. A system according to claim 1, wherein the processing means includes filter means having an input connected to said sensor means and an output connected to said actuating means, the filter means being operable to produce an output signal which has Fourier frequency components corresponding to the components of the nutation indicative signal from the sensor means and in which the phase difference between the first class of the nutation signal components and the respective corresponding components of the filter output signal differs by 180° from the phase difference between the second class of the nutation signal components and the respective corresponding components of the filter output signal.

3. A spin-stabilised spacecraft of which the dynamics permit a nutation mode characterised by an angular velocity of the craft about a non-spin body axis including one or more first Fourier components counteractable by a corresponding anti-phase damping torque component, and also including at least one non-negligible second Fourier component which is counteractable by a corresponding in-phase torque component, the spacecraft having an active nutation damping system which includes:

nutation sensor means for forming a signal indicative of nutation of the spacecraft;

actuator means for applying a nutation compensating force to the spacecraft; and signal processing means connected between the nutation sensor means and the actuator means and operable for deriving an actuator means control signal from the nutation indicative signal, the signal processing means having a frequency dependent input to output phase relationship such that, for the or each first angular velocity component of the spacecraft, the actuator means induces a corresponding opposing torque component on the craft and, for said at least one second angular velocity component, the actuator means induces a corresponding in-phase torque component.

4. A spin-stabilised spacecraft of which the dynamics permit a nutation mode characterised by an angular velocity of the spacecraft about a non-spin body axis including one or more first Fourier components which are best damped by opposing torque components and at least one non-negligible second Fourier component which is best damped by an in-phase torque component, the spacecraft having an active nutation damping system which comprises nutation sensing and signal processing means for forming a control signal representative of the angular velocity of the spacecraft about said axis, and actuator means connected to the nutation sensing and signal processing means and operable for applying about said axis a nutation compensating torque waveform corresponding to said control signal, said nutation sensing and signal processing means including frequency dependent phase varying means operable to introduce a first value of phase difference between any of said first Fourier components of the spacecraft angular velocity and the corresponding components of the control signal, and to introduce a second value of phase difference between said at least one second Fourier component of the spacecraft angular velocity and the corresponding component of the control signal, said first and second values of phase difference being different by substantially 180° electrical degrees.

5. A spin-stabilised spacecraft of which the dynamics permit the craft to enter a nutation mode characterised by the resultant angular velocity of the craft about an axis orthogonal to its spin-axis comprising a first and a second predetermined Fourier component which are respectively dampable by corresponding anti-phase and in-phase torque components applied to the craft about said axis, the spacecraft comprising an active nutation damping system which includes:

accelerometer means connected to the spacecraft for forming a signal indicative of motion of the spacecraft about said axis, filter means connected to the accelerometer means for converting the signal formed by the accelerometer means to an output signal representative of angular velocity of the spacecraft about said axis, the filter means having a frequency dependent phase-changing characteristic for providing a first phase relationship between components of its input and output signals at the frequency of said first predetermined Fourier component and a second substantially opposite phase relationship between components of its input and output signals at the frequency of said second predetermined Fourier component, thruster means connected to the spacecraft for applying nutation compensating torque thereto about said axis, and control logic means connected between said filter means and said thruster means for controlling the thruster means in dependence upon the output signal from the filter means.

* * * * *